March 23, 1926. 1,577,611
A. P. DAVIS
ARC LAMP
Filed Jan. 16, 1918  2 Sheets-Sheet 1
Fig. 1,
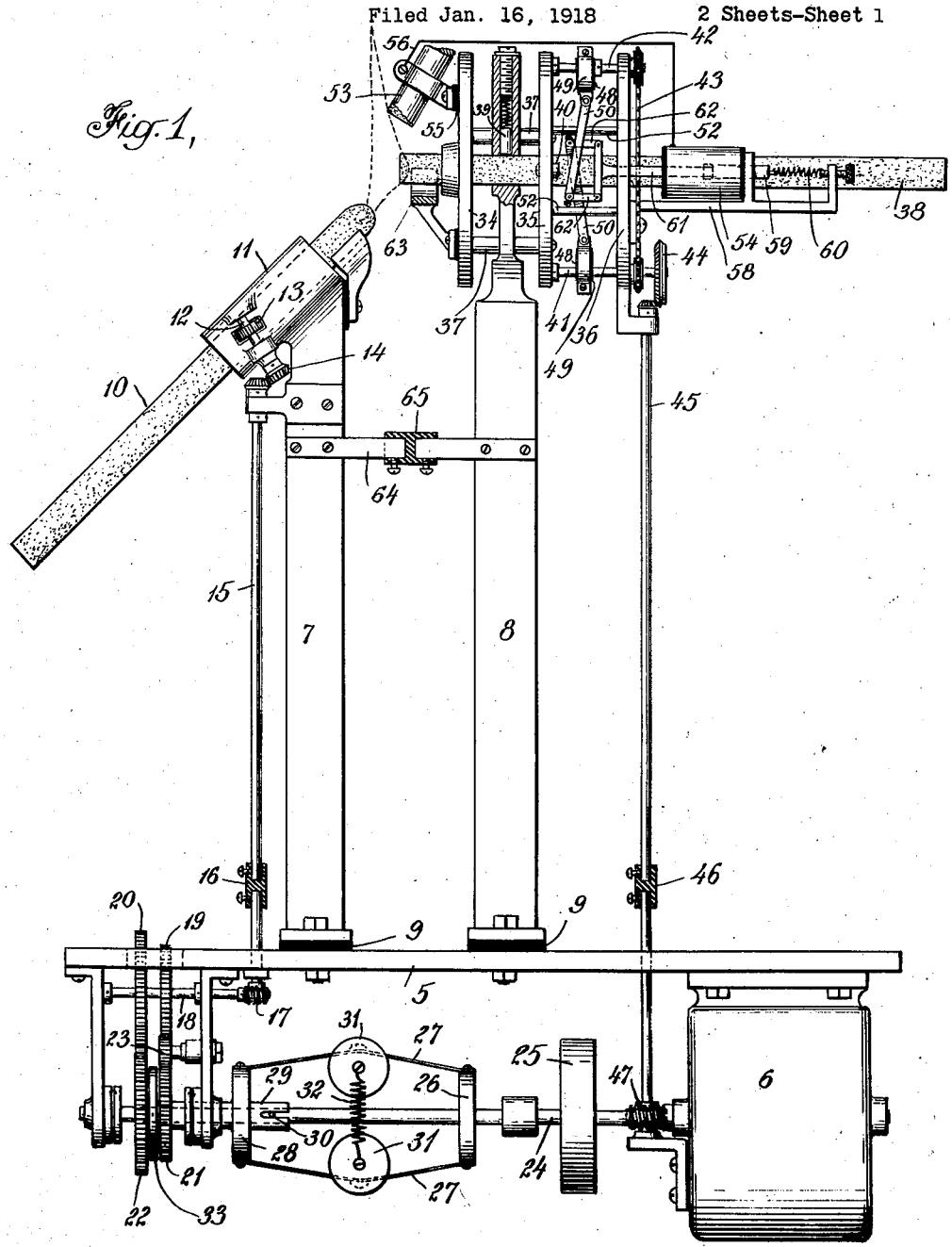
INVENTOR
A. P. Davis,
BY
ATTORNEYS.

March 23, 1926.
A. P. DAVIS
1,577,611
ARC LAMP
Filed Jan. 16, 1918
2 Sheets-Sheet 2
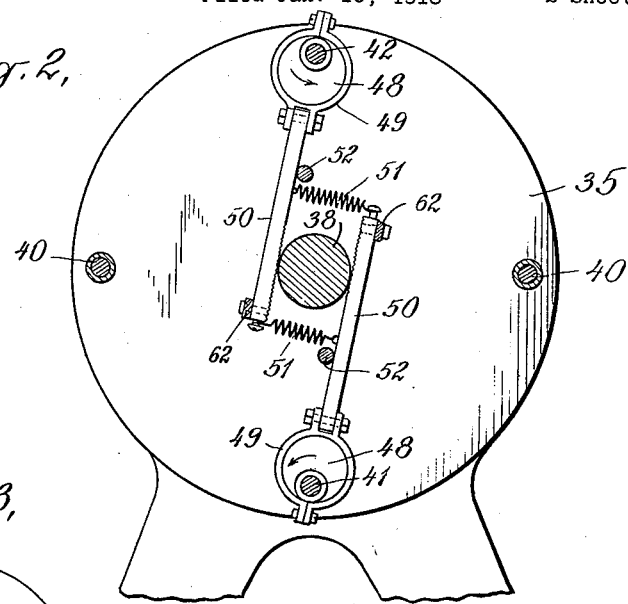
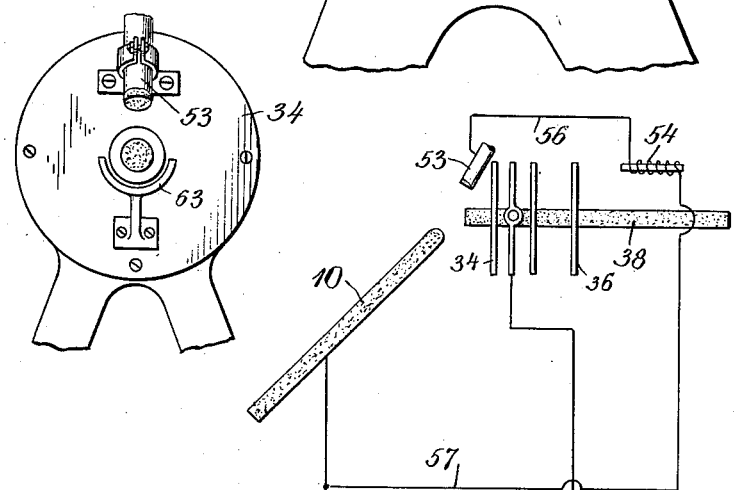
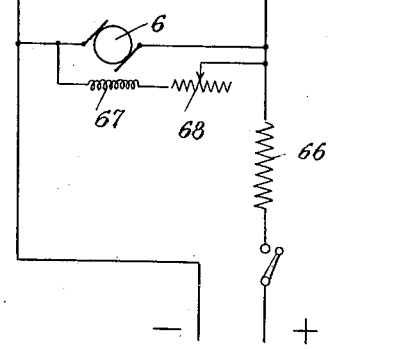
INVENTOR
A. P. Davis,
BY
ATTORNEYS Patented Mar. 23, 1926.

1,577,611

UNITED STATES PATENT OFFICE.

ARTHUR P. DAVIS, OF BROOKLYN, NEW YORK.

ARC LAMP.

Application filed January 16, 1918. Serial No. 212,043.

*To all whom it may concern:*

Be it known that I, ARTHUR P. DAVIS, a citizen of the United States, residing at Brooklyn, in the county of Kings, State of New York, have invented certain new and useful Improvements in Arc Lamps; and I do hereby declare the following to be a full, clear, and exact description of the invention, such as will enable others skilled in the art to which it appertains to make and use the same.

This invention relates to arc lamps, more particularly lamps of the type known as flaming arc lamps, and it is directed more especially to the means for feeding the electrodes to compensate for the consumption thereof, for rotating the electrodes from time to time so as to center the arc properly, and for maintaining the arc at the desired point throughout the operation of the lamp.

One of the features of the invention involves the provision of an improved form of mechanism for intermittently rotating one of the electrodes about its axis and advancing the electrode in the direction of its axis from time to time to compensate for its consumption. This improved mechanism involves the provision of one or more feeding members extending transverse to the electrode, means for reciprocating these feeding members in the direction of their length periodically, and means for causing these feeding members to engage the electrode or a part operatively connected thereto when they are reciprocated in one direction but not when they are reciprocated in the opposite direction. In this way the electrode may be rotated step by step. These same feeding members may be employed for advancing the electrode in the direction of its axis, by arranging the feeding members not exactly transverse to the axis of the electrode but at somewhat of an incline to that position. Furthermore, by providing for an automatic control of the angular inclination of these feeding members, the advance of the electrode in the direction of its axis may be automatically regulated so as to correspond exactly with the rate of consumption of the electrode.

Another feature of the invention involves the provision of means for automatically locating the arc by feeding one of the electrodes forward at a rate directly proportional to the consumption thereon. For this purpose an automatic electric control of the feed of the electrode is employed and this is preferably combined with the feeding mechanism above referred to. The automatic control includes a third electrode arranged adjacent to the flame of the arc extending between the main electrodes of the lamp. As one of the electrodes, preferably the positive electrode, wears away, the flame of the arc comes closer and closer to this third electrode until finally it touches the electrode, whereupon current flows through a control circuit from the positive electrode through the arc to and through the third electrode. This circuit may be arranged to control the feed of the electrode so that a feeding movement or several small feeding movements will be caused by this closure of the control circuit with the result that the positive electrode will be fed forward such a distance as to carry the flame of the arc away from the third electrode and thereby open the control circuit.

When this automatic control of the feed of one of the electrodes is combined with the feeding mechanism above described, the closing and opening of the control circuit is arranged to vary the angular inclination of the feeding members. When the control circuit is open, the feeding members lie transverse to the electrode so that their reciprocation results only in intermittent rotation of the electrodes, but when the control circuit is closed, a magnet therein moves the feeding members to a position at an incline to the electrode so that their reciprocation not only turns the electrode but also advances it in the direction of its axis.

Another feature of the invention involves the construction of the supporting devices for the positive electrode whereby current is carried to the electrode and the parts of the feeding mechanism are shielded from the intense heat of the arc.

Another feature of the invention involves the provision of a deflector for preventing rising currents of air induced by the heat of the arc from acting upon the arc so as to cause it to move away from the desired position with reference to the center lines of the two electrodes.

Another feature of the invention involves the provision of improved feeding means for the negative electrode. This consists preferably of a wheel mounted on a tubular holder for the negative electrode with its plane inclined to the axis of the holder together with improved mechanism for rotating the wheel. By this arrangement of the feeding wheel intermittent rotation of the wheel acts both to advance the electrode through the holder in the direction of its axis and also to rotate the electrode about its axis.

These and other features of the invention will be better understood by reference to the following description taken in conjunction with the accompanying drawings, which illustrate a form in which the invention may be embodied. In these drawings, Fig. 1 is a view of the entire lamp mechanism in elevation with a few of the parts shown in section; Fig. 2 is a view of the feeding mechanism transverse to the axis of the positive electrode; Fig. 3 is a detail view showing the arrangement of the deflector and the third electrode; and Fig. 4 is a diagram of the circuits employed.

Referring to these drawings, all of the parts of the lamp are mounted upon a base plate 5 from the under side of which is suspended a motor 6 for actuating the feeding mechanisms for the two electrodes. The electrodes themselves are mounted upon standards 7 and 8 which extend upward parallel to each other from the base plate 5 and are secured at their lower ends to the base plate, insulating material being interposed between the base and the standards as shown at 9.

The standard 7 for supporting the negative electrode 10 terminates in a tubular holder 11 through which the electrode 10 extends. On the holder 11 are bearings for a short shaft 12 on which a feeding wheel 13 is mounted, this wheel preferably having a knurled periphery. The axis of shaft 12 is offset slightly from a line perpendicular to the axis of the holder 11 so that the wheel 13 lies in a plane inclined to the axis of the electrode 10. The shaft 12 extends through one of its bearings and carries a bevel gear 14 on its end meshing with a similar gear on a shaft 15 having an insulating section 16 therein. The lower end of shaft 15 extends through the base plate 5 and is connected by worm gearing 17 to a shaft 18 carrying two gears 19 and 20. These gears are driven by gears 21 and 22, the gear 22 meshing directly with the gear 20 and the gear 21 driving the gear 19 through an idler 23 mounted as shown. The shaft 24 of the motor 6 has a fly wheel 25 mounted thereon and also a disk 26. A pair of spring arms 27 are connected at one end to the disk 26 and at the other end to a disk 28 mounted on a sleeve 29 which is splined to the shaft 24, as shown at 30. The spring arms 27 also carry weights 31 which are connected by a coiled spring 32. The gear 21 is mounted loosely on the sleeve 29 and the gear 22 is mounted loosely on the shaft 24. Between these two gears is a clutch disk 33 secured upon the end of the sleeve 29 and adapted to be moved into engagement with either of the gears 21 and 22 so as to become clutched thereto and drive the gear. Thus, when the speed of the motor shaft 24 increases, the weights 31 move outwardly, the sleeve 29 moves to the right, and disk 33 engages gear 21, thereby feeding the negative electrode 10 through the parts 21, 23, 19, 18, 17, 15, 14 and 13. When the speed of the motor shaft falls off, the weights 31 move inwardly, sleeve 29 is moved to the left, and disk 33 engages gear 22, thereby operating to feed the electrode 10 in the opposite direction through the parts 22, 20, 18, 17, 15 and 13. When the gear 13 is driven by the motor 6 to effect the feed of the negative electrode 10, it moves the electrode forward in the direction of its axis and also turns the electrode about its axis by reason of the inclination of the plane of the wheel 13 to the axis of the electrode.

The standard 8 for supporting the positive electrode and the feeding mechanism therefor carries three parallel metallic disks which are spaced apart and so connected together that the transmission of heat through them by conduction is greatly reduced, the feeding mechanism particularly being shielded from the intense heat of the arc. These three disks are shown at 34, 35 and 36. The disks 34 and 35 are mounted upon the support 8 by means of posts 37 connecting them together. The support 8 is provided with an opening through which the positive electrode 38 passes and an opening transverse to the opening for the electrode to receive a spring-pressed brush 39 which bears upon the electrode 38 so as to carry current thereto. The disk 36 is supported upon the disk 35 by posts 40 (Fig. 2) which are out of line with the posts 37. The feeding mechanism for moving the electrode 38 about its axis and also in the direction of its axis is located to a large extent between the disks 35 and 36.

A pair of shafts 41 and 42 are mounted for rotation in bearings formed in the disks 35 and 36. These shafts extend through the disk 36 and carry small sprocket wheels on which a chain 43 runs, the two lengths of this chain being on opposite sides of the electrode 38. The shaft 41 also carries a bevel gear 44 meshing with a bevel gear on a shaft 45 having an insulating section 46 therein. The lower end of this shaft extends through the base plate 5 and is connected by worm gearing 47 to the shaft 24 of the motor 6. On the shafts 41 and 42 are eccentrics 48 and the straps 49 of these eccentrics have feeding fingers 50 pivotally connected thereto so as to turn relatively to the straps on axes transverse to the axis of the electrode 38. These feeding fingers 50 are connected together by light spiral springs as shown at 51 in Fig. 2. Also, each finger 50 is adapted to coact with a post 52 extending between the disks 35 and 36 and positioned as shown in Fig. 2.

The operation of these parts of the mechanism is as follows: The continuous rotation of the motor shaft causes rotation of the eccentrics 48 through the gearing 43, 44, 45, 47. The rotation of the eccentrics 48 in the direction of the arrows on Fig. 2 causes the feeding fingers 50 to be reciprocated in the direction of their length, the fingers being moved simultaneously toward each other and then simultaneously away from each other. By reference to Fig. 2, it will be seen that as the two feeding fingers are moving away from each other, they are in contact with the posts 52 and are held by the posts at such an inclination in a plane transverse to the electrode that their ends are out of contact with the electrode. As the feeding fingers near and pass the end of the movement away from each other, they rock upon the posts 52 until their ends come in contact with the electrode 38 and then the fingers pass out of engagement with the posts 52. This rocking movement is caused by the springs 51 and the fingers are held in engagement with the electrode by the springs. This engagement of the fingers with the electrode 38 continues during the opposite reciprocatory movement of the feeding fingers toward each other and during this movement of the fingers toward each other, they grip the electrode 38 between them and turn it about its axis. If the feeding fingers lie in the same plane transverse to the axis of the electrode, the movement of the electrode caused by them is merely a turning movement about its axis. But if the feeding fingers are inclined, as shown in Fig. 1, relative to a plane perpendicular to the axis of the electrode, the turning movement of the electrode about its axis is accompanied by a movement in the direction of the axis, advancing the electrode through the openings in the disks 34, 35 and 36 to compensate for consumption of the electrode. The pivotal connections of the feeding fingers 50 to the eccentric straps 49 permits of varying the angular inclination of the feeding fingers and this inclination is automatically controlled so that although the reciprocatory movement of the feeding fingers is continuous throughout the operation of the lamp, the feed of the electrode takes place only when and to the extent required by the consumption of the electrode.

The automatic control of the angular arrangement of the feeding fingers is effected by a third electrode 53 and a solenoid 54 whose circuit is controlled by the electrode. This third electrode is mounted in a position close to the flame of the arc so that as the positive electrode is consumed, the flame advances toward the third electrode until finally it touches it and permits the flow of current from the positive electrode through the flame to the third electrode 53. This electrode 53 is connected by a wire 56 to the solenoid 54 whose opposite end is connected by a wire 57 (Fig. 4) to the negative wire of the lamp. The solenoid 54 may be mounted upon a bracket 58 secured to the disk 36. The solenoid is provided with a core 59 which is retracted when the circuit of the solenoid is opened by a spring 60 whose tension may be adjusted. The core 59 of the solenoid which is made of soft iron is connected to a yoke 61 of brass which extends through an opening in the disk 36 and has its ends connected by links 62 to the ends of the feeding fingers 50.

The third electrode is preferably in the form of a stick of carbon, similar generally to the two main electrodes of the lamp. It may be supported in a holder in any suitable manner, as is indicated in Fig. 1, where the holder is shown as of the split ring type. This holder is secured to the disk 34, insulating material 55 being interposed between them. The electrode 53 is preferably coated with copper, as such a metallic coating assists materially in carrying away the heat taken up by the electrode from the arc. This coating is melted back a short distance from the end of the electrode, as is indicated in Fig. 1. Wear of the third electrode 53 occurs very slowly as the electrode is in the arc flame for very brief periods of time, occurring only at rather long intervals. The holder for the electrode 53 should be arranged to permit the electrode to be advanced from time to time, but repositioning the third electrode is necessary only at relatively long intervals.

A deflector 63 is mounted upon the disk 34, as shown in Figs. 1 and 3. This deflector is of semi-circular shape and lies under the end of the positive electrode 38 so as to deflect from the electrode the rising current of air induced by the heat of the arc. But for the presence of this deflector, the end of the positive electrode would wear away in an undesirable manner and the arc would be much less steady. A similar deflector is preferably mounted directly under the end of the negative electrode 10, it being secured to the upper end of post 7 with insulating material interposed. The use of such a deflector in conjunction with the negative electrode is particularly desirable when the negative electrode is not protected by a metallic coating such as the electrolytic coating of copper which is sometimes employed. Such a copper coating on an electrode for use in a high intensity arc lamp is undesirable for the reason that it sometimes occurs that when the lamp is tilted to a high angle, particles of copper from the electrode are melted and drop down upon the mirror. When such a deflector as that shown in Fig. 1 is employed in conjunction with the negative electrode, the latter need not be provided with a copper coating.

The two supports 7 and 8 are connected near their upper ends by a brace 64 having an insulating section 65 therein. The provision of this brace is found to be of considerable importance as it is essential that the upper ends of the supports 7 and 8 shall not move relative to each other since such movement would have a detrimental effect upon the arc.

Referring to Fig. 4, it will be seen that the two sides of the circuit to the lamp are connected to the two electrodes 38 and 10, a balancing resistance 66 being included in the positive lead. The armature of the motor 6 is connected across the lines at a point beyond the resistance 66. The field 67 is similarly connected across the lines, an adjustable resistance 68 being provided in the field circuit. As above stated, the third electrode 53 is connected by a wire 56 to the solenoid 54 and the opposite end of the solenoid is connected by the wire 57 to the negative wire.

The operation of the lamp will now be described. When the circuit is closed with the electrodes separated as shown, the armature of the motor 6 is subjected to a relatively high voltage and it begins to rotate at high speed. The high speed of rotation of the motor shaft acts through the centrifugal controller for the clutch disk 33 to cause that disk to engage the gear 21 and thus operate the mechanism for feeding the negative electrode 10 forward through the holder 11. This continues until the negative electrode engages the positive one whereupon the armature of the motor 6 is short circuited. The rotation of the motor shaft continues, however, because of the provision of the fly wheel 25 and as the speed of rotation falls, the disk 33 engages the gear 22 and operates the feeding mechanism for the negative electrode 10 in the opposite direction so as to strike the arc. As the electrodes are separated, the armature of the motor 6 is subjected to the voltage across the arc and the motor shaft is driven electrically at an increasing speed. When a predetermined voltage across the arc is reached, the speed of rotation of the motor shaft will be such that the disk 33 lies between the gears 21 and 22 without driving either of them. Before this condition is reached, there may be a few backward and forward movements of the negative electrode of small magnitude. Throughout the operation of the lamp, the feeding mechanism including the eccentrics 48 is driven continuously.

Normally, the circuit of the solenoid 54 is open at the third electrode 53 and the feeding fingers therefor lie in a plane transverse to the axis of the electrode 38. Therefore, the reciprocatory movement of the feeding fingers operates merely to rotate the electrode 38 on its axis. The burning of the arc results in consumption of the electrode 38 and movement of the flame of the arc to the right in Fig. 1 until finally the flame comes in contact with the third electrode 53, resulting in the flow of current from the positive electrode through the flame of the arc to the electrode 53, wire 56, solenoid 54 and wire 57. The energization of the solenoid 54 results in attraction of the core 59 and movement of the yoke 61 against the tension of spring 60. This operates through the links 62 to move the fingers 50 to the inclined positions in which they are shown in Fig. 1. While this condition exists, the reciprocation of the feeding fingers results in feeding the electrode 38 forward step by step in addition to the rotational movement of the electrode about its axis until the flame of the arc is carried away from the third electrode 53, resulting in opening of the circuit of the solenoid 54. This will usually be followed by readjustment of the position of the negative electrode 10 by the automatic feeding mechanism above described, including the automatic reversible clutch and the centrifugal controller therefor, both clutch and controller being driven by the motor 6. The solenoid 54 and spring 60 may be of small size exerting but little power; preferably the size of these parts would be such that neither would be capable of effecting axial movement of the electrode 38 by itself; instead, they would serve merely to position the fingers 50 while those fingers are out of engagement with the electrode 38, the feed of the electrode 38 being effected solely by the reciprocatory movement of the feeding fingers 50. The construction employed in the supporting and feeding mechanism for the positive electrode is of special value in connection with the intense heat developed at the arc. The first disk acts as a shield and also it absorbs heat from the positive electrode to a considerable extent. To facilitate this, the disk has a boss formed thereon elongating the opening through the disk for the positive electrode, as the increase in the length of the wall of metal surrounding the electrode assists in the absorption of heat. The second disk is connected in the circuit to the positive electrode but as it is spaced from the first disk it is maintained at a much lower temperature. The feeding mechanism lies between the second and third disks where the temperature is still further reduced, particularly as the posts connecting the three disks are staggered to prolong the path through which heat travels by conduction. There is, therefore, a temperature gradient through the head for supporting and feeding the positive electrode from the arc to the other side of the head.

I claim:

1. In an arc lamp, a support for an electrode, a feeding member extending substantially transverse to the electrode, means for reciprocating the feeding member over a path extending substantially transverse to the electrode and means for causing the feeding member to engage the electrode when moved in one direction and disengage it when moved in the other direction; substantially as described.

2. In an arc lamp, a support for an electrode, a feeding member extending substantially transverse to the electrode, means for reciprocating the feeding member, means for causing the feeding member to engage the electrode when moved in one direction and disengage it when moved in the other direction, and means for varying the angular position of the feeding member with reference to the axis of the electrode; substantially as described.

3. In an arc lamp, a support for an electrode, a pair of feeding members lying on opposite sides of the electrode and substantially transverse to the axis thereof, means for reciprocating the members in the direction of their length, and means for causing the members to engage the electrode when moved in one direction and disengage it when moved in the other direction; substantially as described.

4. In an arc lamp, a support for an electrode, a pair of feeding members lying on opposite sides of the electrode and substantially transverse to the axis thereof, means for reciprocating the members in the direction of their length, means for causing the members to engage the electrode when moved in one direction and disengage it when moved in the other direction, and means for varying the angular positions of the feeding members with reference to the axis of the electrode; substantially as described.

5. In an arc lamp, a support for an electrode, a pair of feeding members lying on opposite sides of the electrode and substantially transverse to the axis thereof, means for yieldingly connecting the feeding members, means for reciprocating the feeding members in the direction of their length, and stationary abutments with which the feeding members coact during their reciprocatory movement; substantially as described.

6. In an arc lamp, a support for an electrode, a pair of feeding members lying on opposite sides of the electrode and substantially transverse to the axis thereof, means for yieldingly connecting the feeding members, means for reciprocating the feeding members in the direction of their length, stationary abutments with which the feeding members coact during their reciprocatory movement, and means for varying the angular position of the feeding members with reference to the axis of the electrode; substantially as described.

7. In an arc lamp, a support for an electrode, a pair of feeding members lying on opposite sides of the electrode and extending substantially transverse to the axis thereof, a pair of power-driven eccentrics, straps on the eccentrics to which the feeding members are connected, means for yieldingly connecting the feeding members, and stationary abutments with which the feeding members coact when they are moved by the eccentrics; substantially as described.

8. In an arc lamp, a movable electrode, a pair of feeding members lying on opposite sides of the electrode and substantially transverse to the axis thereof, a pair of power-driven eccentrics, straps on the eccentrics to which the feeding members are pivotally connected, means for yieldingly connecting the feeding members, stationary abutments with which the feeding members coact when they are moved by the eccentrics, and means for turning the feeding members about their pivotal connections to the eccentric straps; substantially as described.

9. In an arc lamp, a base plate, a pair of supports mounted on the base plate and extending upwardly therefrom, means for supporting and feeding an electrode carried at the upper end of each of the supports, a brace extending between the two supports at a distance from the base and having an insulating section therein, and driving mechanism mounted on the under side of the base and connected to the feeding mechanisms for the two electrodes; substantially as described.

In testimony whereof I affix my signature.

ARTHUR P. DAVIS.